(12) United States Patent
Lyu

(10) Patent No.: US 11,064,512 B2
(45) Date of Patent: Jul. 13, 2021

(54) METHOD AND APPARATUS FOR RECEIVING AND SENDING DOWNLINK CONTROL INFORMATION

(71) Applicant: Huawei Technologies Co., Ltd., Shenzhen (CN)

(72) Inventor: Yongxia Lyu, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/579,249

(22) Filed: Sep. 23, 2019

(65) Prior Publication Data

US 2020/0022164 A1  Jan. 16, 2020

Related U.S. Application Data

(63) Continuation of application No. PCT/CN2018/080334, filed on Mar. 23, 2018.

(30) Foreign Application Priority Data

Mar. 23, 2017 (CN) .......................... 201710179469.X

(51) Int. Cl.
*H04W 72/04* (2009.01)
*H04W 72/12* (2009.01)

(52) U.S. Cl.
CPC ... *H04W 72/1268* (2013.01); *H04W 72/1289* (2013.01)

(58) Field of Classification Search
CPC ....... H04L 1/1854; H04L 1/1887; H04L 1/18; H04W 72/1268; H04W 72/1289;
(Continued)

(56) References Cited

U.S. PATENT DOCUMENTS 10,735,136 B2 * 8/2020 Yoshimoto ........ H04W 72/0466
2011/0039568 A1 * 2/2011 Zhang ............... H04W 72/1268
455/452.1
(Continued)

FOREIGN PATENT DOCUMENTS

CN        106507497 A    3/2017
EP          3179644 A1    6/2017
(Continued)

OTHER PUBLICATIONS

"On grant-free UL transmissions for URLLC," 3GPP TSG RAN WG1, Meeting #88, Athens, Greece, R1-1702996, XP051210138, pp. 1-3, 3rd Generation Partnership Project, Valbonne, France (Feb. 13-17, 2017).

(Continued)

*Primary Examiner* — Nathan S Taylor
(74) *Attorney, Agent, or Firm* — Leydig, Voit & Mayer, Ltd.

(57) ABSTRACT

In a method for receiving downlink control information, a terminal device sends first data to a network device in a first time unit, where the first data is uplink transmission without uplink grant signaling. The terminal device further receives downlink control information in a second time unit, where the downlink control information includes resource allocation information and a first radio network temporary identifier (RNTI). The terminal device determines, based on the first RNTI, that the downlink control information is for the uplink transmission without uplink grant signaling; and retransmits a part or all of the first data on a resource corresponding to the resource allocation information, or sends second data on a resource corresponding to the resource allocation information, where the second data and the first data are data of a same HARQ process.

17 Claims, 4 Drawing Sheets

(58) Field of Classification Search
CPC ......... H04W 72/0413; H04W 72/1284; H04W 72/12; H04W 72/04; H04W 28/02; H04W 74/08
See application file for complete search history.

(56) References Cited

U.S. PATENT DOCUMENTS

| | | | |
|---|---|---|---|
| 2011/0305197 A1* | 12/2011 | Park | H04W 74/002 370/328 |
| 2012/0093094 A1* | 4/2012 | Zhang | H04L 1/0079 370/329 |
| 2012/0213196 A1* | 8/2012 | Chung | H04W 74/08 370/330 |
| 2016/0337087 A1 | 11/2016 | Chen et al. | |
| 2016/0338112 A1* | 11/2016 | Lee | H04W 72/042 |
| 2018/0123765 A1* | 5/2018 | Cao | H04L 1/1822 |
| 2018/0176945 A1* | 6/2018 | Cao | H04W 72/1268 |
| 2018/0199359 A1* | 7/2018 | Cao | H04L 5/0094 |
| 2018/0199381 A1 | 7/2018 | Rong et al. | |
| 2018/0206262 A1* | 7/2018 | Cao | H04W 56/0005 |
| 2018/0234839 A1* | 8/2018 | Tenny | H04W 12/0401 |
| 2018/0262945 A1* | 9/2018 | Yi | H04L 1/1887 |
| 2018/0270807 A1* | 9/2018 | Salem | H04L 5/0048 |
| 2018/0294940 A1* | 10/2018 | Lee | H04W 72/14 |
| 2018/0295644 A1* | 10/2018 | Yi | H04W 28/0278 |
| 2019/0068334 A1* | 2/2019 | Stern-Berkowitz | H04L 1/1812 |
| 2019/0158337 A1* | 5/2019 | Yoon | H04L 27/2666 |
| 2019/0357222 A1* | 11/2019 | Lou | H04W 4/70 |
| 2020/0092805 A1* | 3/2020 | Zhang | H04W 76/28 |
| 2020/0154400 A1* | 5/2020 | Byun | H04W 72/04 |
| 2020/0213984 A1* | 7/2020 | Hwang | H04W 74/002 |

FOREIGN PATENT DOCUMENTS

| | | |
|---|---|---|
| JP | 2014147104 A | 8/2014 |
| KR | 20170015969 A | 2/2017 |
| WO | 2015103383 A1 | 7/2015 |
| WO | 2016190592 A1 | 12/2016 |

OTHER PUBLICATIONS

"Basic Grant-free Transmission for URLLC," 3GPP TSG RAN WG1 Meeting #88, Athens Greece, R1-1701594, pp. 1-8, 3rd Generation Partnership Project, Valbonne, France (Feb. 13-17, 2017).

* cited by examiner

METHOD AND APPARATUS FOR RECEIVING AND SENDING DOWNLINK CONTROL INFORMATION

CROSS-REFERENCE TO RELATED APPLICATIONS

This application is a continuation of International Application No. PCT/CN2018/080334, filed on Mar. 23, 2018, which claims priority to Chinese Patent Application No. 201710179469.X, filed on Mar. 23, 2017. The disclosures of the aforementioned applications are hereby incorporated by reference in their entireties.

TECHNICAL FIELD

The present invention relates to the field of communications technologies, and in particular, to a method and an apparatus for receiving and sending downlink control information.

BACKGROUND

A 5G communications system is dedicated to supporting higher system performance. The 5G communications system supports a plurality of service types, different deployment scenarios, and a wider spectrum range. The plurality of service types include enhanced mobile broadband (eMBB), massive machine type communication (mMTC), ultra-reliable and low latency communications (URLLC), a multimedia broadcast multicast service (MBMS), a positioning service, and the like. The different deployment scenarios include indoor hotspot, dense urban, suburban, urban macro, and high-speed rail scenarios, and the like. The wider spectrum range means that 5G supports a spectrum range up to 100 GHz, including both a low-frequency part below 6 GHz and a high-frequency part from 6 GHz to 100 GHz.

Compared with a 4G communications system, the 5G communications system has one more major characteristic: supporting a URLLC service. There are many types of URLLC services, and typical use cases include industrial control, industrial manufacturing process automation, man-machine interaction, telemedicine, and the like.

There are two types of URLLC services: a periodic service, in which a data packet arrives periodically and semi-persistent scheduling may be used; and a sporadic service, in which arrival of a data packet is unpredictable, semi-persistent scheduling is not suitable, and dynamic scheduling in long term evolution (LTE) also causes a latency in data packet transmission. Without steps of sending an uplink resource request of a user and a downlink scheduling instruction of a base station, a grant-free uplink transmission manner can reduce both a physical layer processing and transmission latency and signaling overheads, and therefore becomes a candidate technology for URLLC uplink transmission.

A specific implementation of the grant-free uplink transmission manner (namely, an uplink transmission manner without uplink grant signaling) is as follows:

A base station preconfigures one uplink resource or one group of uplink resources (a resource pool) for a terminal device.

When determining that uplink data needs to be sent, the terminal device selects the preconfigured resource or randomly selects a resource from the preconfigured resource pool for data transmission. It can be learned that, if two terminal devices select a same resource in a preset manner to send uplink data, different users may send data on a same resource, that is, a resource collision occurs. As shown in FIG. 1, a terminal device 1 and a terminal device 3 select a same resource, causing a resource collision. The resource collision affects uplink reception of the base station. The base station may use an advanced receiver algorithm (for example, multi-user interference cancellation) to increase implementation complexity, thereby reducing impact of the resource collision.

To ensure a low latency and high reliability of uplink data transmission, grant-free uplink transmission supports a repeated transmission manner. As shown in FIG. 2, uplink data may be repeatedly sent K times (including initial transmission) until the base station correctly performs demodulation and decoding. Based on a solution in the prior art, it can be determined that when a terminal device sends uplink data, if a resource collision occurs, the terminal device always stops sending the uplink data after repeatedly sending the uplink data K times, resources are wasted, and additional interference is caused to a system. Therefore, to avoid repeated sending of grant-free uplink data, the terminal device needs to terminate sending of the uplink data in the following cases:

A1. The uplink data has been repeatedly sent K times.

A2. The terminal device receives acknowledgement information of correct receiving, for example, an acknowledgement (ACK), that is sent in response to a current time of data sending.

A3. The terminal device receives a piece of uplink scheduling information that is sent in response to a current time of data sending.

For the last two cases, because the terminal device cannot determine when a network device can detect the terminal device and correctly receive the data, the terminal device starts to monitor feedback information or uplink scheduling information after sending the uplink data. In the prior art, the terminal device continuously monitors the feedback information or the uplink scheduling information, increasing a latency in uplink data transmission of the terminal device and reducing system spectral efficiency.

SUMMARY

The present invention provides a method and an apparatus for receiving and sending downlink control information. The method and apparatus provided in the present invention resolve prior-art problems, for example, a latency in uplink data transmission of the terminal device is increased and system spectral efficiency is reduced when the terminal device continuously monitors feedback information or uplink scheduling information if a resource collision occurs in grant-free uplink data transmission.

According to a first aspect, a method for receiving downlink control information is provided, and the method includes:

sending, by a terminal device, first data to a network device in a first time unit, where the first data is uplink transmission without uplink grant signaling, and the first time unit is a time value for sending the first data;

receiving, by the terminal device in a second time unit, downlink control information from the network device, where the downlink control information includes resource allocation information and a first radio network temporary identifier RNTI corresponding to the downlink control information;

determining, based on the first RNTI, that the downlink control information is for the uplink transmission without uplink grant signaling; and retransmitting, by the terminal device, a part or all of the first data on a resource corresponding to the resource allocation information, or sending, by the terminal device, second data on a resource corresponding to the resource allocation information, where the second data and the first data are data of a same hybrid automatic repeat request (HARQ) process.

In this embodiment, the terminal device determines, based on a specific RNTI (namely, the first RNTI) delivered by the network device, that the currently sent control information is for the uplink transmission without uplink grant signaling; and after receiving the RNTI, the terminal device may stop monitoring feedback information or uplink scheduling information, thereby reducing a latency in uplink data transmission of the terminal device and improving system spectral efficiency.

In another optional implementation, the downlink control information further includes a time offset indication, and the time offset indication is used to indicate a time offset between data that the downlink control information is for and the downlink control information; and after the determining, by the terminal device based on the first RNTI, that the downlink control information is for the uplink transmission without uplink grant signaling and before the retransmitting, by the terminal device, a part or all of the first data on a resource corresponding to the resource allocation information, the method further includes:

determining, by the terminal device based on the time offset indication and the second time unit, that the downlink control information is for the first data sent in the first time unit.

In another optional implementation, the downlink control information further includes the time offset indication;

after the determining, by the terminal device based on the first RNTI, that the downlink control information is for the uplink transmission without uplink grant signaling and before the sending, by the terminal device, second data on a resource corresponding to the resource allocation information, the method further includes:

determining, by the terminal device based on the time offset indication and the second time unit, that the downlink control information is for the HARQ process corresponding to the first data sent in the first time unit; and the sending, by the terminal device, second data on a resource corresponding to the resource allocation information includes:

sending, by the terminal device on the resource corresponding to the resource allocation information, the second data corresponding to the HARQ process.

In another optional implementation, the sending, by a terminal device, first data to a network device in a first time unit includes: sending, by the terminal device, the first data to the network device on a first resource in the first time unit, where the first resource belongs to a resource set of the uplink transmission without uplink grant signaling; and the method further includes: stopping, by the terminal device based on the downlink control information, sending data corresponding to the HARQ process on a resource in the resource set.

In another optional implementation, a time offset value indicated by the time offset indication is one in a preset time offset set, the preset time offset set includes at least one time offset value, and each time offset value corresponds to a time offset indication.

In another optional implementation, before the sending, by a terminal device, first data to a network device in a first time unit, the method further includes:

receiving, by the terminal device, higher layer signaling from the network device, where the higher layer signaling indicates the time offset set, and/or the higher layer signaling indicates a time offset value corresponding to each time offset indication in the time offset set.

In the foregoing optional implementations, the downlink control information further carries the time offset indication during transmission, so that when the terminal device supports uplink transmission of a plurality of HARQ processes, the terminal device may determine, based on the time offset indication, a transport block of a HARQ process that the current downlink control information is for.

In another optional implementation, the downlink control information further includes a new data indicator (NDI), values of the NDI represent at least two states, a first state in the at least two states indicates that the part or all of the first data is to be retransmitted, and a second state in the at least two states indicates that the second data is to be sent; and the retransmitting, by the terminal device, a part or all of the first data on a resource corresponding to the resource allocation information, or sending, by the terminal device, second data on a resource corresponding to the resource allocation information includes:

retransmitting, by the terminal device based on the first state of the NDI, the part or all of the first data on the resource corresponding to the resource allocation information, or sending, by the terminal device based on the second state of the NDI, the second data on the resource corresponding to the resource allocation information.

According to a second aspect, a method for receiving downlink control information is provided, and the method includes:

sending, by a terminal device, first data to a network device, where the first data is uplink transmission without uplink grant signaling;

receiving, by the terminal device, downlink control information from the network device, where the downlink control information includes a first HARQ process number and resource allocation information;

if the terminal device determines that the first HARQ process number is the same as an obtained second HARQ process number, determining, by the terminal device, that the downlink control information is for the uplink transmission without uplink grant signaling; and retransmitting, by the terminal device, a part or all of the first data on a resource corresponding to the resource allocation information, or sending, by the terminal device, second data on a resource corresponding to the resource allocation information, where the second data and the first data are data of a same hybrid automatic repeat request HARQ process.

In another optional implementation, the downlink control information further includes a new data indicator NDI, values of the NDI represent at least two states, a first state in the at least two states indicates that the part or all of the first data is to be retransmitted, and a second state in the at least two states indicates that the second data is to be sent; and the retransmitting, by the terminal device, a part or all of the first data on a resource corresponding to the resource allocation information, or sending, by the terminal device, second data on a resource corresponding to the resource allocation information includes:

retransmitting, by the terminal device based on the first state of the NDI, the part or all of the first data on the resource corresponding to the resource allocation information, or sending, by the terminal device based on the second state of the NDI, the second data on the resource corresponding to the resource allocation information.

In another optional implementation, before the receiving, by the terminal device, downlink control information from the network device, the method further includes:

obtaining, by the terminal device, the second HARQ process number from predefined HARQ process numbers; or obtaining, by the terminal device, the second HARQ process number from configuration information sent by the network device.

According to a third aspect, a method for sending downlink control information is provided, and the method includes:

receiving, by a network device in a first time unit, first data sent by a terminal device, where the first data is uplink transmission without uplink grant signaling;

sending, by the network device, downlink control information to the terminal device in a second time unit, where the downlink control information includes resource allocation information and a first radio network temporary identifier RNTI corresponding to the downlink control information, and the first RNTI is used to indicate that the downlink control information is for the uplink transmission without uplink grant signaling; and receiving, by the network device, a part or all of the first data retransmitted by the terminal device on a resource corresponding to the resource allocation information, or receiving, by the network device, second data sent by the terminal device on a resource corresponding to the resource allocation information, where the second data and the first data are data of a same hybrid automatic repeat request HARQ process.

In an optional implementation, the downlink control information further includes a time offset indication, and the time offset indication is used to indicate a time offset between data that the downlink control information is for and the downlink control information; and before the sending, by the network device, downlink control information to the terminal device in a second time unit, the method further includes:

determining, by the network device, a time offset indication between the first time unit and the second time unit.

In an optional implementation, a time offset value indicated by the time offset indication is one in a preset time offset set, the preset time offset set includes at least one time offset value, and each time offset value corresponds to a time offset indication.

In an optional implementation, before the sending, by the network device, downlink control information to the terminal device in a second time unit, the method includes:

sending, by the network device, higher layer signaling to the terminal device, where the higher layer signaling indicates the time offset set, and/or the higher layer signaling indicates a time offset value corresponding to each time offset indication in the time offset set.

In an optional implementation, the downlink control information further includes a new data indicator NDI, values of the NDI represent at least two states, a first state in the at least two states indicates that the part or all of the first data is to be retransmitted, and a second state in the at least two states indicates that the second data is to be sent; and if the downlink control information includes the first state of the NDI, the network device receives, on the resource corresponding to the resource allocation information, the part or all of the first data retransmitted by the terminal device; or if the downlink control information includes the second state of the NDI, the network device receives, on the resource corresponding to the resource allocation information, the second data sent by the terminal device.

In an optional implementation, the downlink control information is for the first data sent in the first time unit, and the resource corresponding to the resource allocation information is a resource for retransmitting the first data; or the downlink control information is for the HARQ process corresponding to the first data, and the resource corresponding to the resource allocation information is a resource for transmitting the second data corresponding to the HARQ process.

According to a fourth aspect, a terminal device is provided, including:

a transceiver, configured to send first data to a network device in a first time unit, and receive, in a second time unit, downlink control information from the network device, where the first data is uplink transmission without uplink grant signaling, and the downlink control information includes resource allocation information and a first radio network temporary identifier RNTI corresponding to the downlink control information; and a processor, configured to determine, based on the first RNTI, that the downlink control information is for the uplink transmission without uplink grant signaling, where the transceiver is further configured to retransmit a part or all of the first data on a resource corresponding to the resource allocation information, or send second data on a resource corresponding to the resource allocation information, where the second data and the first data are data of a same hybrid automatic repeat request HARQ process.

In an optional implementation, the downlink control information further includes a time offset indication, and the time offset indication is used to indicate a time offset between data that the downlink control information is for and the downlink control information; and the processor is further configured to determine, based on the time offset indication and the second time unit, that the downlink control information is for the first data sent in the first time unit.

In an optional implementation, the downlink control information further includes the time offset indication;

the processor is further configured to determine, based on the time offset indication and the second time unit, that the downlink control information is for the HARQ process corresponding to the first data sent in the first time unit; and the transceiver is specifically configured to send, on the resource corresponding to the resource allocation information, the second data corresponding to the HARQ process.

In an optional implementation, that the transceiver sends first data to a network device in a first time unit includes: sending the first data to the network device on a first resource in the first time unit, where the first resource belongs to a resource set of the uplink transmission without uplink grant signaling; and the processor is further configured to determine, based on the downlink control information, to stop sending data corresponding to the HARQ process on a resource in the resource set.

In an optional implementation, a time offset value indicated by the time offset indication is one in a preset time offset set, the preset time offset set includes at least one time offset value, and each time offset value corresponds to a time offset indication.

In an optional implementation, the transceiver is further configured to receive higher layer signaling from the network device, where the higher layer signaling indicates the time offset set, and/or the higher layer signaling indicates a time offset value corresponding to each time offset indication in the time offset set.

In an optional implementation, the downlink control information further includes a new data indicator NDI, values of the NDI represent at least two states, a first state in the at least two states indicates that the part or all of the first data is to be retransmitted, and a second state in the at least two states indicates that the second data is to be sent; and that the transceiver retransmits a part or all of the first data on a resource corresponding to the resource allocation information, or sends second data on a resource corresponding to the resource allocation information includes:

retransmitting, based on the first state of the NDI, the part or all of the first data on the resource corresponding to the resource allocation information, or sending, based on the second state of the NDI, the second data on the resource corresponding to the resource allocation information.

According to a fifth aspect, a network device is provided, including:

a receiver, configured to receive, in a first time unit, first data sent by a terminal device, where the first data is uplink transmission without uplink grant signaling; and a transmitter, configured to send downlink control information to the terminal device in a second time unit, where the downlink control information includes resource allocation information and a first radio network temporary identifier RNTI corresponding to the downlink control information, and the first RNTI is used to indicate that the downlink control information is for the uplink transmission without uplink grant signaling, where the receiver is further configured to receive a part or all of the first data retransmitted by the terminal device on a resource corresponding to the resource allocation information, or second data sent on a resource corresponding to the resource allocation information, where the second data and the first data are data of a same hybrid automatic repeat request HARQ process.

In an optional implementation, the network device further includes a processor, configured to: determine a time offset indication based on a time offset status between the first time unit and the second time unit, and add the time offset indication to the downlink control information, where the time offset indication is used to indicate a time offset between data that the downlink control information is for and the downlink control information.

In an optional implementation, the processor is specifically configured to use the time offset indication to indicate a time offset value in a preset time offset set, the preset time offset set includes at least one time offset value, and each time offset value corresponds to a time offset indication.

In an optional implementation, the transmitter is further configured to send the preset time offset set to the terminal device by using higher layer signaling, where the higher layer signaling indicates the time offset set, and/or the higher layer signaling indicates a time offset value corresponding to each time offset indication in the time offset set.

In an optional implementation, the downlink control information sent by the transmitter further includes a new data indicator NDI, values of the NDI represent at least two states, a first state in the at least two states indicates that the part or all of the first data is to be retransmitted, and a second state in the at least two states indicates that the second data is to be sent, so that the terminal device retransmits, based on the first state of the NDI, the part or all of the first data on the resource corresponding to the resource allocation information, or the terminal device sends, based on the second state of the NDI, the second data on the resource corresponding to the resource allocation information.

In the solutions provided in the embodiments of this application, the terminal device determines, based on a specific RNTI (namely, the first RNTI) delivered by the network device, that the currently sent control information is for the uplink transmission without uplink grant signaling; and after receiving the RNTI, the terminal device may stop monitoring feedback information or uplink scheduling information, thereby reducing a latency in uplink data transmission of the terminal device and improving system spectral efficiency.

DESCRIPTION OF EMBODIMENTS

To describe a specific implementation process of the solutions provided in the present invention more clearly, methods provided in the embodiments of this application are further described below in detail with reference to specific examples.

Figure 1:
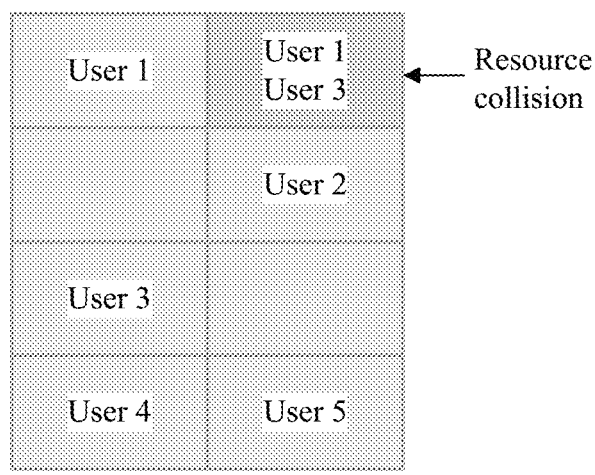
FIG. 1 is a schematic diagram of a case in which users select a same resource, causing a resource collision.
Figure 2:
FIG. 2 is a schematic diagram of repeatedly sending uplink data of a user K times.
Figure 3:
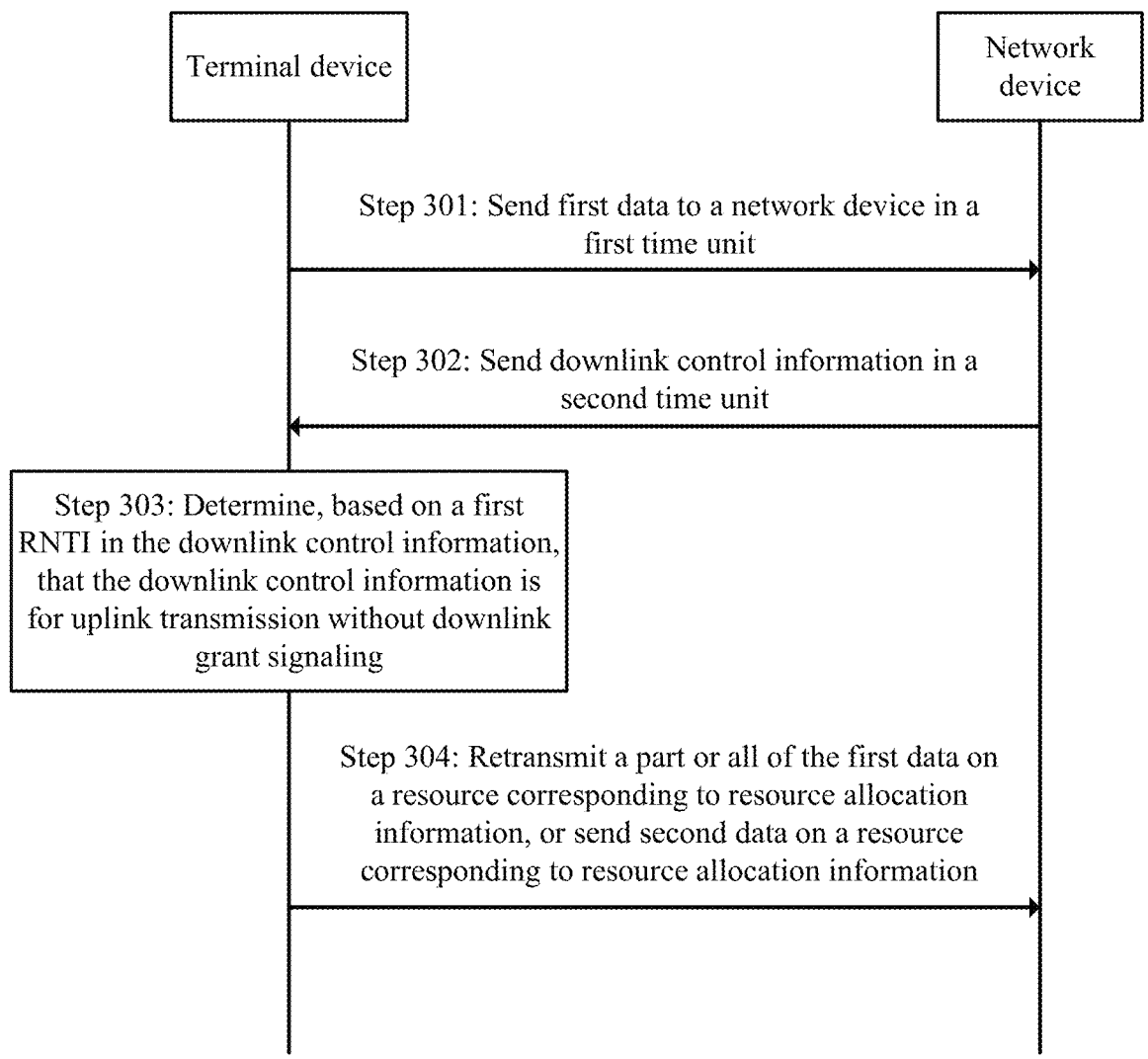
FIG. 3 is a schematic flowchart of a method for receiving downlink control information according to an embodiment of this application.

As shown in FIG. 3, an embodiment of this application provides a method for receiving downlink control information, and the method may specifically include the following implementation steps.

Step 301: A terminal device sends first data to a network device in a first time unit, where the first data is uplink transmission without uplink grant signaling.

Step 302: The network device sends downlink control information to the terminal device in a second time unit, where the downlink control information includes resource allocation information and a first radio network temporary identifier (RNTI) corresponding to the downlink control information, and the first RNTI is used to indicate that the downlink control information is for the uplink transmission without uplink grant signaling.

When the terminal device supports uplink transmission of a plurality of hybrid automatic repeat request (HARQ)

processes, in order that the terminal device determines a transport block of a HARQ process that the current downlink control information is for, in this embodiment, a time offset between the transport block corresponding to the HARQ process and the downlink control information may be further carried in the downlink control information. Therefore, before the sending, by the network device, downlink control information to the terminal device in a second time unit, the method includes:

determining, by the network device, a time offset indication based on a time offset status between the first time unit and the second time unit, and adding the time offset indication to the downlink control information, where the time offset indication is used to indicate a time offset between data that the downlink control information is for and the downlink control information.

Step 303: After receiving the downlink control information, the terminal device determines, based on the first RNTI in the downlink control information, that the downlink control information is for the uplink transmission without uplink grant signaling.

In this embodiment, the network device may send the first RNTI to the terminal device in a plurality of manners. In one manner, the network device may use the first RNTI as a scrambling code to scramble a cyclic redundancy check bit of the downlink control information; and then correspondingly, when descrambling the cyclic redundancy check bit of the downlink control information, the terminal device uses the first RNTI as a scrambling code to descramble the cyclic redundancy check bit of the downlink control information.

When sending the downlink control information, the network device may use the first RNTI to scramble the cyclic redundancy check bit of the downlink control information, and send scrambled downlink control information to the terminal device.

That after receiving the downlink control information, the terminal device determines, based on the first RNTI in the downlink control information, that the downlink control information is for the uplink transmission without uplink grant signaling includes:

descrambling, by the terminal device, the cyclic redundancy check bit of the downlink control information by using the first RNTI; and if a checksum of descrambled cyclic redundancy check bit is zero, determining, by the terminal device, that the downlink control information is for the uplink transmission without uplink grant signaling.

Step 304: The terminal device retransmits a part or all of the first data on a resource corresponding to the resource allocation information, or the terminal device sends second data on a resource corresponding to the resource allocation information, where the second data and the first data are data of a same HARQ process.

In this embodiment, the downlink control information is for the first data sent in the first time unit, and the resource corresponding to the resource allocation information is a resource for retransmitting the first data; or the downlink control information is for the HARQ process corresponding to the first data, and the resource corresponding to the resource allocation information is a resource for transmitting the second data corresponding to the HARQ process.

The network device receives the part or all of the first data retransmitted by the terminal device on the resource corresponding to the resource allocation information, or the second data sent by the terminal device on the resource corresponding to the resource allocation information.

In this embodiment, after it is determined that the downlink control information is for the uplink transmission without uplink grant signaling, a new data indicator (NDI) sent by the network device may be further used to determine whether to retransmit the first data or to send the new second data. A specific implementation process may be as follows:

A1. The network device adds the new data indicator NDI to the downlink control information. Values of NDI represent at least two states, a first state in the at least two states indicates that the part or all of the first data is to be retransmitted, and a second state in the at least two states indicates that the second data is to be sent.

A2. The terminal device retransmits, based on the first state of the NDI, the part or all of the first data on the resource corresponding to the resource allocation information, or the terminal device sends, based on the second state of the NDI, the second data on the resource corresponding to the resource allocation information.

Optionally, because the uplink transmission without uplink grant signaling occupies a large quantity of resources, to improve resource utilization, in this embodiment, if it is determined that no data requires the uplink transmission without uplink grant signaling, the uplink transmission without uplink grant signaling can be terminated. A specific implementation may be as follows:

That a terminal device sends first data to a network device in a first time unit includes: sending, by the terminal device, the first data to the network device on a first resource in the first time unit, where the first resource belongs to a resource set of the uplink transmission without uplink grant signaling.

The method further includes: stopping, by the terminal device based on the downlink control information, sending data corresponding to the HARQ process on a resource in the resource set.

In this embodiment, if the terminal device sends a plurality of pieces of data to the network device, data for which the network device sends the downlink control information may be determined by using the following implementation. After the determining, by the terminal device based on the first RNTI, that the downlink control information is for the uplink transmission without uplink grant signaling, and before the retransmitting, by the terminal device, a part or all of the first data on a resource corresponding to the resource allocation information, the method specifically includes:

determining, by using the time offset indication, the first data corresponding to the downlink control information. Specifically:

B1. The network device adds the time offset indication to the downlink control information, where the time offset indication may indicate an offset status between the downlink control information including the time offset indication and corresponding data.

Optionally, the network device may determine the time offset indication based on the time offset status between the first time unit and the second time unit, and add the time offset indication to the downlink control information.

Specifically, the determining, by the network device, a time offset indication based on a time offset status between the first time unit and the second time unit may be:

determining, by the network device, a time offset value between the first time unit and the second time unit; and determining, based on a preset time offset set, the time offset indication corresponding to the time offset value, where the preset time offset set includes a correspondence between at least one time offset value and at least one time offset indication.

Optionally, a specific implementation of sending, by the network device, the preset time offset set to the terminal device may be:

sending, by the network device, the time offset set to the terminal device by using higher layer signaling.

B2. The terminal device determines, based on the time offset indication in the downlink control information and the second time unit, that the downlink control information is for the first data sent in the first time unit.

Further, the second data corresponding to the downlink control information is determined by using the time offset indication. Specifically, the terminal device determines, based on the time offset indication and the second time unit, that the downlink control information is for the HARQ process corresponding to the first data sent in the first time unit; and the sending, by the terminal device, second data on a resource corresponding to the resource allocation information includes:

sending, by the terminal device on the resource corresponding to the resource allocation information, the second data corresponding to the HARQ process.

To help the network device to send the time offset indication to the terminal device, the time offset indication may be determined in the following manner in this embodiment of this application. A specific implementation includes the following steps.

C1. The terminal device receives the higher layer signaling from the network device, where the higher layer signaling indicates the time offset set, and/or the higher layer signaling indicates an offset value corresponding to each time offset indication in the time offset set.

A time offset value indicated by the time offset indication is one in the preset time offset set, the preset time offset set includes at least one time offset value, and each time offset value corresponds to a time offset indication.

C2. After receiving the time offset indication, the terminal device may compare the time offset indication with the preset time offset set that is received in advance, to determine a specific time offset value. The data corresponding to the currently received downlink control information can be determined from the plurality of pieces of data based on the time offset value.

For example, time offset values in the preset time offset set may be {1, 2, 4, 8}. The network device uses 2-bit information (the time offset indication) in the higher layer signaling to indicate the four values. A correspondence between the time offset value and the time offset indication may be: 00 indicates 1, 01 indicates 2, 10 indicates 4, and 11 indicates 8. When the time offset value between the downlink control information and the data is 4, the time offset indication of 10 may be sent to the terminal device. After receiving the time offset indication of 10, the terminal device may determine, by using the previously received preset time offset values {1, 2, 4, 8}, that a time offset value between data that needs to be processed and the downlink control information is 4.

In this embodiment, a HARQ process number indication information field in scheduling-based downlink control information may be reused to transmit the time offset indication. In other words, a field for transmitting the time offset indication is the same as the HARQ process number indication information field in the scheduling-based downlink control information.

In this embodiment of this application, after determining, based on the received RNTI, that the downlink control information is for the uplink transmission without uplink grant signaling, the terminal device may terminate the uplink transmission without uplink grant signaling, to effectively terminate or dynamically adjust grant-free uplink transmission of the terminal device. Thus, waste of resources, additional interference to a system, and waste of power of the terminal device that are caused because the terminal device still sends data when the network device has correctly received uplink data sent by the terminal device can be avoided.

Figure 4:
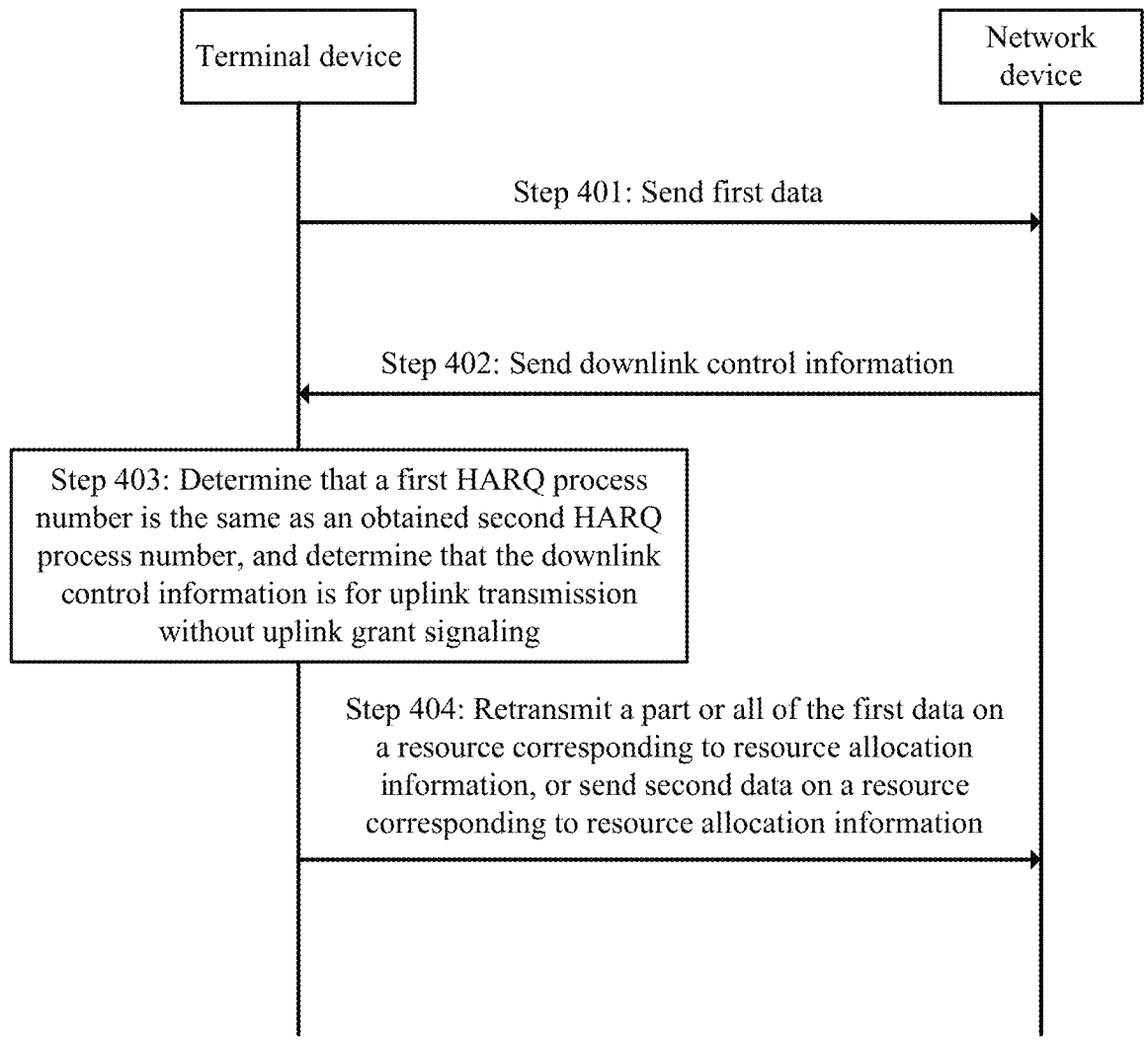
FIG. 4 is a schematic flowchart of another method for receiving downlink control information according to an embodiment of this application.

As shown in FIG. 4, an embodiment of this application further provides another method for receiving downlink control information, and the method may specifically include the following implementation steps.

Step 401: A terminal device sends first data to a network device, where the first data is uplink transmission without uplink grant signaling.

Step 402: The network device sends downlink control information to the terminal device, where the downlink control information includes a first HARQ process number and resource allocation information, and the first HARQ process number is used to indicate that the downlink control information is for the uplink transmission without uplink grant signaling.

In this embodiment, the first HARQ process number indicates a dedicated HARQ process configured by the network device, and the first HARQ process number is used at least to indicate that the first data is the uplink transmission without uplink grant signaling. The process number of the dedicated HARQ process is different from that of other HARQ processes. The other HARQ processes are used only for dynamic uplink scheduling.

To make the terminal device determine that the received HARQ process number is a special process number, before the network device sends the downlink control information to the terminal device, the network device may further send the specific HARQ process number to the terminal device. A specific implementation may be as follows:

The network device sends configuration information to the terminal device, where the configuration information includes a second HARQ process number, so that the terminal device determines, based on the second HARQ process number, that the first HARQ is used to indicate that the downlink control information is for the uplink transmission without uplink grant signaling.

Step 403: After receiving the downlink control information, if the terminal device determines that the first HARQ process number is the same as the obtained second HARQ process number, the terminal device determines that the downlink control information is for the uplink transmission without uplink grant signaling.

In this embodiment, before the network device sends the first HARQ process number, the terminal device may obtain the second HARQ process number in the following specific manner:

The terminal device obtains the second HARQ process number from predefined HARQ process numbers; or the terminal device obtains the second HARQ process number from the configuration information sent by the network device.

Step 404: The terminal device retransmits a part or all of the first data on a resource corresponding to the resource allocation information, or sends second data on a resource corresponding to the resource allocation information, where the second data and the first data are data of a same hybrid automatic repeat request HARQ process.

In this embodiment, after receiving the downlink control information, the terminal device may determine, by using an NDI in the downlink control information, whether to retransmit data or send new data. A specific implementation may be as follows:

Values of NDI represent at least two states, a first state in the at least two states indicates that the part or all of the first data is to be retransmitted, and a second state in the at least two states indicates that the second data is to be sent. The method specifically includes:

retransmitting, by the terminal device based on the first state of the NDI, the part or all of the first data on the resource corresponding to the resource allocation information, or sending, by the terminal device based on the second state of the NDI, the second data on the resource corresponding to the resource allocation information.

The network device receives, on the resource corresponding to the resource allocation information, the part or all of the first data retransmitted by the terminal device, or receives, on the resource corresponding to the resource allocation information, the second data sent by the terminal device.

Figure 5:
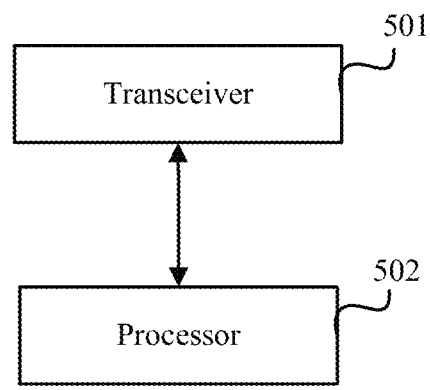
FIG. 5 is a schematic structural diagram of a terminal device according to an embodiment of this application.

As shown in FIG. 5, an embodiment of this application further provides a terminal device. The terminal device is configured to perform the method disclosed in the method embodiments described herein. Implementations corresponding to characteristics of this embodiment and beneficial effects thereof are the same as those of the method embodiments. Details need not be repeated herein. Specifically, the terminal device may include:

a transceiver 501, configured to send first data to a network device in a first time unit, and receive, in a second time unit, downlink control information from the network device, where the first data is uplink transmission without uplink grant signaling, and the downlink control information includes resource allocation information and a first radio network temporary identifier RNTI corresponding to the downlink control information; and a processor 502, configured to determine, based on the first RNTI, that the downlink control information is for the uplink transmission without uplink grant signaling.

The transceiver 501 is further configured to retransmit a part or all of the first data on a resource corresponding to the resource allocation information, or send second data on a resource corresponding to the resource allocation information, where the second data and the first data are data of a same hybrid automatic repeat request HARQ process.

Optionally, the processor 502 is specifically configured to descramble a cyclic redundancy check bit of the downlink control information by using the first RNTI.

Optionally, if the downlink control information further includes a time offset indication, and the time offset indication is used to indicate a time offset between data that the downlink control information is for and the downlink control information, the processor 502 is further configured to determine, based on the time offset indication and the second time unit, that the downlink control information is for the first data sent in the first time unit.

Optionally, if the downlink control information further includes the time offset indication, the processor 502 is further configured to determine, based on the time offset indication and the second time unit, that the downlink control information is for the HARQ process corresponding to the first data sent in the first time unit; and the transceiver 501 is specifically configured to send, on the resource corresponding to the resource allocation information, the second data corresponding to the HARQ process.

Optionally, that the transceiver 501 sends first data to a network device in a first time unit includes: sending the first data to the network device on a first resource in the first time unit, where the first resource belongs to a resource set of the uplink transmission without uplink grant signaling; and the processor 502 is further configured to determine, based on the downlink control information, to stop sending data corresponding to the HARQ process on a resource in the resource set.

Optionally, the processor 502 is further configured to determine, from a preset time offset set, a time offset value indicated by the time offset indication, where the preset time offset set includes a correspondence between at least one time offset value and at least one time offset indication.

Optionally, the transceiver 501 is further configured to receive higher layer signaling from the network device, where the higher layer signaling indicates the time offset set, and/or the higher layer signaling indicates a time offset value corresponding to each time offset indication in the time offset set.

Optionally, if the downlink control information further includes a new data indicator NDI, values of the NDI represents at least two states, a first state in the at least two states indicates that the part or all of the first data is to be retransmitted, and a second state in the at least two states indicates that the second data is to be sent. That the transceiver retransmits a part or all of the first data on a resource corresponding to the resource allocation information, or sends second data on a resource corresponding to the resource allocation information includes:

retransmitting, based on the first state of the NDI, the part or all of the first data on the resource corresponding to the resource allocation information, or sending, based on the second state of the NDI, the second data on the resource corresponding to the resource allocation information.

Figure 6:
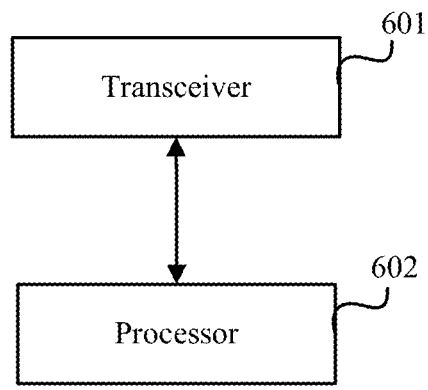
FIG. 6 is a schematic structural diagram of another terminal device according to an embodiment of this application.

As shown in FIG. 6, an embodiment of this application further provides another terminal device, including:

a transceiver 601, configured to send first data to a network device, and receive downlink control information from the network device, where the downlink control information includes a first HARQ process number and resource allocation information, and the first data is uplink transmission without uplink grant signaling; and a processor 602, configured to determine that the first HARQ process number is the same as an obtained second HARQ process number, and determine that the downlink control information is for the uplink transmission without uplink grant signaling.

The transceiver 601 is further configured to retransmit a part or all of the first data on a resource corresponding to the resource allocation information, or send second data on a resource corresponding to the resource allocation information, where the second data and the first data are data of a same hybrid automatic repeat request HARQ process.

Optionally, if the downlink control information further includes a new data indicator NDI, values of the NDI represent at least two states, a first state in the at least two states indicates that the part or all of the first data is to be retransmitted, and a second state in the at least two states indicates that the second data is to be sent.

That the transceiver 601 retransmits a part or all of the first data on a resource corresponding to the resource allocation information, or the terminal device sends second data on a resource corresponding to the resource allocation information includes:

retransmitting, based on the first state of the NDI, the part or all of the first data on the resource corresponding to the resource allocation information, or sending, based on the second state of the NDI, the second data on the resource corresponding to the resource allocation information.

Optionally, the processor 602 is specifically configured to obtain the second HARQ process number from predefined HARQ process numbers, or obtain the second HARQ process number from configuration information sent by the network device.

Figure 7:
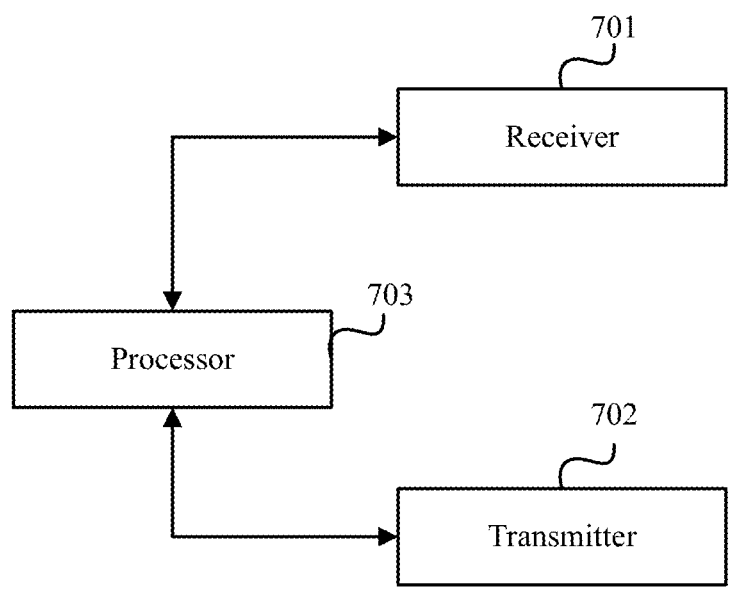
FIG. 7 is a schematic structural diagram of a network device according to an embodiment of this application.

As shown in FIG. 7, an embodiment of this application further provides a network device, including:

a receiver 701, configured to receive, in a first time unit, first data sent by a terminal device, where the first data is uplink transmission without uplink grant signaling; and a transmitter 702, configured to send downlink control information to the terminal device in a second time unit, where the downlink control information includes resource allocation information and a first radio network temporary identifier RNTI corresponding to the downlink control information, and the first RNTI is used to indicate that the downlink control information is for the uplink transmission without uplink grant signaling.

The receiver 701 is further configured to receive a part or all of the first data retransmitted by the terminal device on a resource corresponding to the resource allocation information, or second data sent by the terminal device on a resource corresponding to the resource allocation information, where the second data and the first data are data of a same hybrid automatic repeat request HARQ process.

Optionally, the network device further includes a processor 703, configured to scramble a cyclic redundancy check bit of the downlink control information by using the first RNTI.

Optionally, the processor 703 is configured to: determine a time offset indication based on a time offset status between the first time unit and the second time unit, and add the time offset indication to the downlink control information, where the time offset indication is used to indicate a time offset between data that the downlink control information is for and the downlink control information.

Optionally, the processor 703 is specifically configured to use the time offset indication to indicate one in a preset time offset set, the preset time offset set includes at least one time offset value, and each time offset value corresponds to a time offset indication.

Optionally, the transmitter 702 is further configured to send the preset time offset set to the terminal device by using higher layer signaling, where the higher layer signaling indicates the time offset set, and/or the higher layer signaling indicates a time offset value corresponding to each time offset indication in the time offset set.

Optionally, the downlink control information sent by the transmitter 702 further includes a new data indicator NDI, values of the NDI represents at least two states, a first state in the at least two states indicates that the part or all of the first data is to be retransmitted, and a second state in the at least two states indicates that the second data is to be sent.

Optionally, the downlink control information is for the first data sent in the first time unit, and the resource corresponding to the resource allocation information is a resource for retransmitting the first data; or the downlink control information is for the HARQ process corresponding to the first data, and the resource corresponding to the resource allocation information is a resource for transmitting the second data corresponding to the HARQ process.

Figure 8:
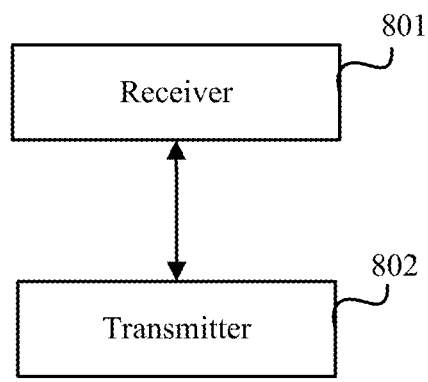
FIG. 8 is a schematic structural diagram of another network device according to an embodiment of this application.

As shown in FIG. 8, an embodiment of this application further provides another network device, including:

a receiver 801, configured to receive first data sent by a terminal device, where the first data is uplink transmission without uplink grant signaling; and a transmitter 802, configured to send downlink control information to the terminal device, where the downlink control information includes a first HARQ process number and resource allocation information, and the first HARQ is used to indicate that the downlink control information is for the uplink transmission without uplink grant signaling.

The receiver 801 is further configured to receive a part or all of the first data retransmitted by the terminal device on a resource corresponding to the resource allocation information, or second data sent by the terminal device on a resource corresponding to the resource allocation information, where the second data and the first data are data of a same hybrid automatic repeat request HARQ process.

Optionally, the downlink control information sent by the transmitter 802 further includes a new data indicator NDI, values of the NDI represent at least two states, a first state in the at least two states indicates that the part or all of the first data is to be retransmitted, and a second state in the at least two states indicates that the second data is to be sent, so that the terminal device retransmits, based on the first state of the NDI, the part or all of the first data on the resource corresponding to the resource allocation information, or the terminal device sends, based on the second state of the NDI, the second data on the resource corresponding to the resource allocation information.

Optionally, the transmitter 802 is further configured to send configuration information to the terminal device, where the configuration information includes a second HARQ process number, so that the terminal device determines, based on the second HARQ process number, that the first HARQ is used to indicate that the downlink control information is for the uplink transmission without uplink grant signaling.

Embodiments of the present invention are not limited to the embodiments described in the Description of Embodiments. Other implementations obtained by a person skilled in the art according to the technical solutions disclosed herein still fall within a technical innovation scope of embodiments of the present invention.

It will also be understood that a person skilled in the art can make various modifications and variations to the embodiments of present invention without departing from the spirit and scope of the embodiments described herein. Embodiments of the present invention are intended to cover these modifications and variations provided that they fall within the protection scope defined by the following claims and their equivalent technologies.

What is claimed is:

1. A method for receiving downlink control information at a terminal device in a communications network, comprising:
sending first data to a network device in a first time unit, wherein the first data is an uplink transmission without uplink grant signaling;
receiving, in a second time unit, the downlink control information from the network device, wherein the downlink control information comprises resource allocation information and a first radio network temporary identifier (RNTI) corresponding to the downlink control information;
determining, based on the first RNTI, that the downlink control information is for the uplink transmission; and
retransmitting a part or all of the first data on a resource corresponding to the resource allocation information, or sending second data on a resource corresponding to the resource allocation information, wherein the second data and the first data are data of a same hybrid automatic repeat request (HARQ) process, wherein the downlink control information further comprises a time offset indication, and the time offset indication is used to indicate a time offset between data that the downlink control information is for and the downlink control information, and after the determining, based on the first RNTI, that the downlink control information is for the uplink transmission without uplink grant signaling and before the retransmitting a part or all of the first data on a resource corresponding to the resource allocation information, the method further comprises:

determining, based on the time offset indication and the second time unit, that the downlink control information is for the first data sent in the first time unit.

2. The method according to claim 1, wherein
a time offset value indicated by the time offset indication is one in a preset time offset set, the preset time offset set comprises at least one time offset value, and each time offset value corresponds to a time offset indication.

3. The method according to claim 2, wherein before the sending first data to a network device in a first time unit, the method further comprises:

receiving higher layer signaling from the network device, wherein the higher layer signaling indicates at least one of the time offset set and a time offset value corresponding to each time offset indication in the time offset set.

4. The method according to claim 1, wherein the downlink control information further comprises the time offset indication;

after the determining, based on the first RNTI, that the downlink control information is for the uplink transmission without uplink grant signaling and before the sending second data on a resource corresponding to the resource allocation information, the method further comprises:

determining, based on the time offset indication and the second time unit, that the downlink control information is for the HARQ process corresponding to the first data sent in the first time unit; and the sending second data on a resource corresponding to the resource allocation information comprises:

sending, on the resource corresponding to the resource allocation information, the second data corresponding to the HARQ process.

5. The method according to claim 1, wherein
the sending first data to a network device in a first time unit comprises: sending the first data to the network device on a first resource in the first time unit, wherein the first resource belongs to a resource set of the uplink transmission without uplink grant signaling; and the method further comprises: stopping, based on the downlink control information, sending data corresponding to the HARQ process on a resource in the resource set.

6. The method according to claim 1, wherein the downlink control information further comprises a new data indicator (NDI), a first state of the NDI in at least two states of the NDI indicates that the part or all of the first data is to be retransmitted, and a second state of the NDI in the at least two states of the NDI indicates that the second data is to be sent; and the retransmitting a part or all of the first data on a resource corresponding to the resource allocation information, or sending second data on a resource corresponding to the resource allocation information comprises:

retransmitting, based on the first state of the NDI, the part or all of the first data on the resource corresponding to the resource allocation information, or sending, based on the second state of the NDI, the second data on the resource corresponding to the resource allocation information.

7. A method for sending downlink control information from a network device in a communications network, comprising:

receiving, in a first time unit, first data sent by a terminal device, wherein the first data is an uplink transmission without uplink grant signaling;

sending the downlink control information to the terminal device in a second time unit, wherein the downlink control information comprises resource allocation information and a first radio network temporary identifier (RNTI) corresponding to the downlink control information, and the first RNTI indicates that the downlink control information is for the uplink transmission without uplink grant signaling; and receiving, on a resource corresponding to the resource allocation information, a part or all of the first data retransmitted by the terminal device, or receiving, on a resource corresponding to the resource allocation information, second data sent by the terminal device, wherein the second data and the first data are data of a same hybrid automatic repeat request (HARQ) process, wherein the downlink control information further comprises a time offset indication, and the time offset indication is used to indicate a time offset between data that the downlink control information is for and the downlink control information; and before the sending downlink control information to the terminal device in a second time unit, the method further comprises:

determining a time offset indication between the first time unit and the second time unit.

8. The method according to claim 7, wherein
a time offset value indicated by the time offset indication is one in a preset time offset set, the preset time offset set comprises at least one time offset value, and each time offset value corresponds to a time offset indication.

9. The method according to claim 8, wherein before the sending downlink control information to the terminal device in a second time unit, the method comprises:

sending higher layer signaling to the terminal device, wherein the higher layer signaling indicates at least one of the time offset set and a time offset value corresponding to each time offset indication in the time offset set.

10. An apparatus, comprising: a processor and a memory that is coupled to the processor, wherein the memory is configured to store a program, which when executed by the processor causes the apparatus to implement a method comprising:

sending first data to a network device in a first time unit, wherein the first data is an uplink transmission without uplink grant signaling;

receiving, in a second time unit, downlink control information from the network device, wherein the downlink control information comprises resource allocation information and a first radio network temporary identifier (RNTI) corresponding to the downlink control information;

determining, based on the first RNTI, that the downlink control information is for the uplink transmission; and retransmitting a part or all of the first data on a resource corresponding to the resource allocation information, or sending second data on a resource corresponding to the resource allocation information, wherein the second data and the first data are data of a same hybrid automatic repeat request (HARQ) process, wherein the downlink control information further comprises a time offset indication, and the time offset indication is used to indicate a time offset between data that the downlink control information is for and the downlink control information, the method further comprises:

determining, based on the time offset indication and the second time unit, that the downlink control information is for the first data sent in the first time unit.

11. The apparatus according to claim 10, wherein the downlink control information further comprises the time offset indication;

the method further comprising:

determining, based on the time offset indication and the second time unit, that the downlink control information is for the HARQ process corresponding to the first data sent in the first time unit;

wherein the sending second data on a resource corresponding to the resource allocation information comprises:

sending, on the resource corresponding to the resource allocation information, the second data corresponding to the HARQ process.

12. The apparatus according to claim 10, wherein the sending first data to a network device in a first time unit comprises: sending the first data to the network device on a first resource in the first time unit, wherein the first resource belongs to a resource set of the uplink transmission without uplink grant signaling; and the method further comprising:

stopping, based on the downlink control information, sending data corresponding to the HARQ process on a resource in the resource set.

13. The apparatus according to claim 10, wherein a time offset value indicated by the time offset indication is one in a preset time offset set, the preset time offset set comprises at least one time offset value, and each time offset value corresponds to a time offset indication.

14. The apparatus according to claim 13, the method further comprising:

receiving higher layer signaling from the network device, wherein the higher layer signaling indicates the time offset set, and/or the higher layer signaling indicates a time offset value corresponding to each time offset indication in the time offset set.

15. The apparatus according to claim 10, wherein the downlink control information further comprises a new data indicator (NDI), a first state of the NDI in at least two states of the NDI indicates that the part or all of the first data is to be retransmitted, and a second state of the NDI in the at least two states of the NDI indicates that the second data is to be sent; and the retransmitting a part or all of the first data on a resource corresponding to the resource allocation information, or sending second data on a resource corresponding to the resource allocation information comprises:

retransmitting, based on the first state of the NDI, the part or all of the first data on the resource corresponding to the resource allocation information, or sending, based on the second state of the NDI, the second data on the resource corresponding to the resource allocation information.

16. An apparatus, comprising: a processor and a memory that is coupled to the processor, wherein the memory is configured to store a program, which when executed by the processor causes the apparatus to implement a method comprising:

receiving, in a first time unit, first data sent by a terminal device, wherein the first data is an uplink transmission without uplink grant signaling;

sending downlink control information to the terminal device in a second time unit, wherein the downlink control information comprises resource allocation information and a first radio network temporary identifier (RNTI) corresponding to the downlink control information, and the first RNTI indicates that the downlink control information is for the uplink transmission without uplink grant signaling; and receiving, on a resource corresponding to the resource allocation information, a part or all of the first data retransmitted by the terminal device, or receiving, on a resource corresponding to the resource allocation information, second data sent by the terminal device, wherein the second data and the first data are data of a same hybrid automatic repeat request (HARQ) process, wherein the downlink control information further comprises a time offset indication, and the time offset indication is used to indicate a time offset between data that the downlink control information is for and the downlink control information; and the method further comprises:

determining a time offset indication between the first time unit and the second time unit.

17. The apparatus according to claim 16, wherein a time offset value indicated by the time offset indication is one in a preset time offset set, the preset time offset set comprises at least one time offset value, and each time offset value corresponds to a time offset indication.

* * * * *